United States Patent [19]

Murata et al.

[11] 4,216,579
[45] Aug. 12, 1980

[54] STORAGE BATTERY PLATE WRAPPING MACHINE

[75] Inventors: Kazuo Murata; Kotofusa Kuroda, both of Takatsuki, Japan

[73] Assignee: Yuasa Battery Company Limited, Takatsuki, Japan

[21] Appl. No.: 927,845

[22] Filed: Jul. 25, 1978

[30] Foreign Application Priority Data

Jul. 28, 1977 [JP] Japan .................................. 52-91220

[51] Int. Cl.² ...................... B23P 19/04; H01M 2/18
[52] U.S. Cl. ................................... 29/730; 29/623.2
[58] Field of Search ...................... 29/623.1, 730, 731, 29/623.2; 429/147; 53/141, 389

[56] References Cited

U.S. PATENT DOCUMENTS

| | | | |
|---|---|---|---|
| 2,373,082 | 4/1945 | Staelin | 29/730 |
| 2,465,493 | 3/1949 | Strickhouser et al. | 429/147 |
| 2,624,106 | 1/1953 | Lund | 29/730 |
| 4,003,758 | 1/1977 | Palmer et al. | 429/147 |
| 4,026,000 | 5/1977 | Anderson | 29/730 |
| 4,080,727 | 3/1978 | Stolle et al. | 29/730 |
| 4,080,732 | 3/1978 | Eberle | 29/623.1 |

FOREIGN PATENT DOCUMENTS

| | | | |
|---|---|---|---|
| 471034 | 1/1951 | Canada | 429/147 |
| 715448 | 9/1954 | United Kingdom | 429/147 |
| 816676 | 7/1959 | United Kingdom | 429/147 |

*Primary Examiner*—Daniel C. Crane
*Attorney, Agent, or Firm*—Watson, Cole, Grindle & Watson

[57] ABSTRACT

This invention relates to a plate wrapping machine for storage batteries. It comprises an embosser for embossing a flat microporous sheet pulled from a supply reel to obtain a storage battery separator, a plate projector for separating and projecting plates one by one out of a hopper, a separator supplier for supplying the above mentioned embossed separator so as to intersect rectangularly with the projected plate and a separator sealing means for sealing the side parts of the embossed separator folded into two to wrap the plate, and wherein the respective components are operatively connected with one another in an on-line operation.

The present invention has an advantage that a storage battery plate can be wrapped with an embossed separator quickly at a high efficiency by saving labor so that the cost of the product may be reduced.

8 Claims, 9 Drawing Figures

STORAGE BATTERY PLATE WRAPPING MACHINE

BACKGROUND

1. Field of the Invention
2. Prior Art

The present invention relates to storage battery manufacturing machines and more particularly to an improved plate wrapping machine for storage batteries.

2. Prior Art

It is already proposed, for example, in a U.S. patent application Ser. No. 882,392 filed on Mar. 1, 1978 to obtain a wrapped plate by supplying separator material pulled from a supply reel so as to intersect rectangularly with a plate, folding the microporous separator into two to wrap the plate and sealing the side parts of the separator.

However, to further improve the performance and life of a storage battery, an embossed separator may be used in place of the flat microporous separator. In such a case, it will be substantially impossible to wind up a long embossed separator on a winding roller in advance. That is to say, when it is so wound up, the concavo-convex patterns of the embossed separator will interfere with each other and therefore will be hard to wind under a low tension. Also, when it is wound up on the roller under a high tension, the concavo-convex patterns of the embossed separator will be deformed and the separator will no longer be suitable for a storage battery. Even if it is to be wound on a winding roller, the result is a bulky mass due to the thickness caused by the concavo-convex patterns and the length of the embossed separator will have to be very short. As a result, the embossed separator wound on the winding roller is unwound in a short time and therefore will have to be constantly replenished. Because of such disadvantages, in such a case, complications arise and the battery plate making operating efficiency will be very low.

SUMMARY OF THE INVENTION

The present invention aims to overcome all of the above-mentioned disadvantages.

A first object of the present invention is to provide a novel storage battery wrapping machine for automatically and quickly wrapping a storage battery plate with an embossed separator to obtain a storage battery having high performance and long life.

A second object of the present invention is to provide a novel storage battery plate wrapping machine wherein respective component means are mechanically integrally combined to be operatively connected with one another in an on-line operation.

A third object of the present invention is to provide a storage battery plate wrapping machine having high efficiency so that the cost of the product can be expected to be reduced.

BRIEF DESCRIPTION OF THE FIGURES

The above objects and advantages of the present invention can be easily understood with reference to the following description and drawings in which:

In FIGS. 1 and 2, symbol A indicates an embossing means formed of a supply reel 1, an embossing roll 2 and elastic roll 3 pressed into contact with each other by a pressurizing device 4 and cooling rolls 5 and 5'. Also a guide roll 6, nipping rolls 7 and 7' and a guide roll 8 are provided in respective proper positions. A long flat thin microporous sheet S of a thickness less then 0.5 mm. made of a synthetic resin is wound up on the supply reel 1. The embossing roll 2 is made of metal, is provided with about 50 to 200 projections 2' per 100 square cm on the surface and is heated by a heater. A more enlarged view of the embossing roll is shown in FIG. 5. The elastic roll 3 has a flat surface, is made of synthetic rubber such as neoprene and is of a hardness of about 42 to 90 degrees or preferably about 65 degrees (Shore-A scale). The embossing roll 2 and elastic roll 3 are held under a fixed pressure by the pressurizing device 4. The pressurizing device 4 presses both of the above mentioned rolls into contact with each other under a proper pressure by means of an air cylinder or oil pressure cylinder and a solenoid valve operating to open and close. A more enlarged view of these components is shown in FIG. 3.

Figure 1:
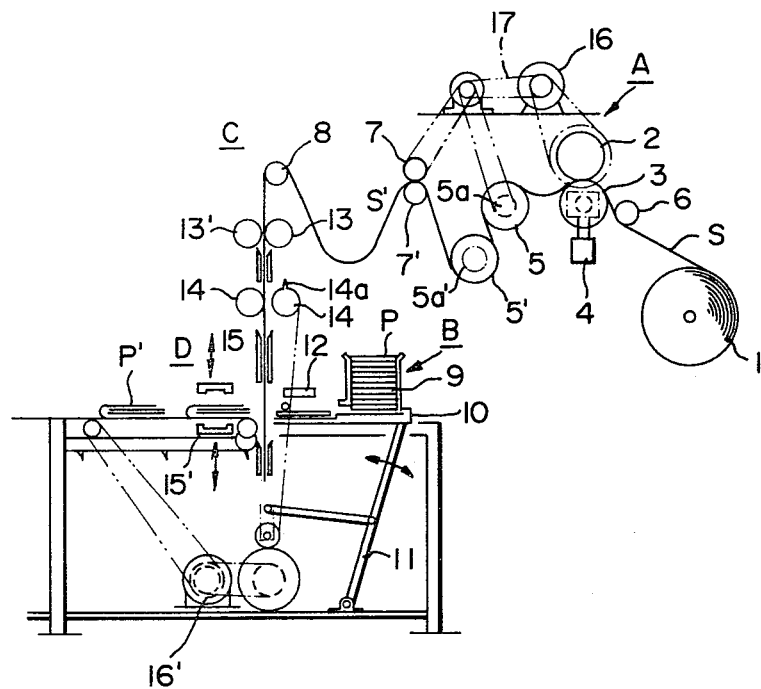
FIG. 1 is an elevation view of a storage battery plate wrapping machine according to the present invention.
Figure 2:
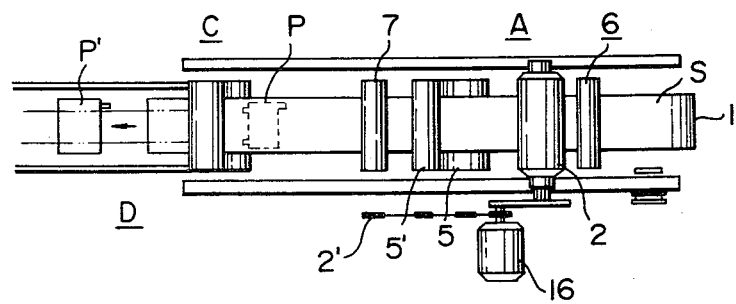
FIG. 2 is a plan view of the same.
Figure 3:
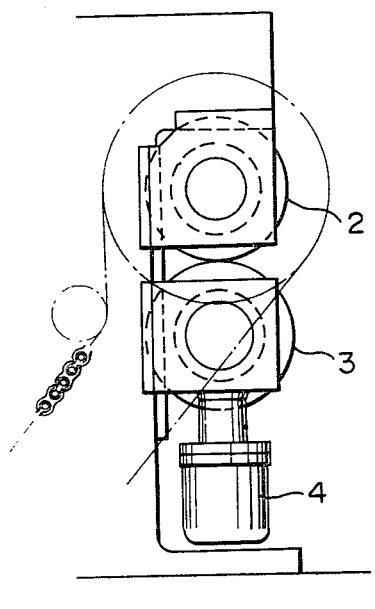
FIG. 3 is an enlarged elevation view of a pressurizing device for both an embossing roll and an elastic roll in an embossing means.
Figure 4:
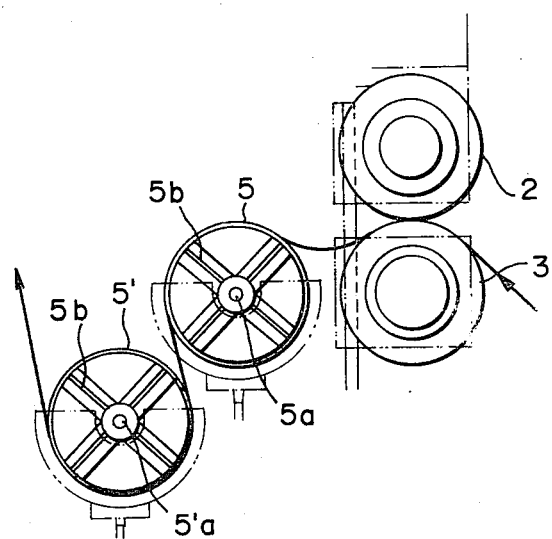
FIG. 4 is an enlarged elevation view of a plurality of cooling rolls in addition to the embossing roll and elastic roll in the embossing means.
Figure 6:
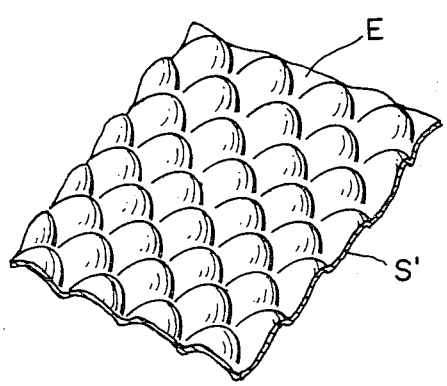
FIG. 6 is an enlarged perspective view of a part of the embossed separator.

The cooling rolls 5 and 5' are respectively made of stainless steel drums or chromium-plated steel pipes, each being provided therein with a hollow bearing axle $5a$ or $5'a$ and supporting axle $5b$ or $5'b$. The cooling rolls are so formed that cooling water may flow into the cooling rolls through the hollow bearing shafts $5a$ and $5'a$ from outside and then may be discharged. A plate separating projector B is formed of a hopper 9, projecting plate 10 and rocking lever 11, as shown in FIG. 1. Many plates P are stacked in the hopper 9. The projecting plate 10 having two stepped surfaces is provided below the hopper 9, and is reciprocated by the rocking lever 11. Reference numeral 12 indicates a stopping element for stopping the entire apparatus in case no plate P is separated and projected out of the plate projection. It can be, for example, a limit switch, proximity switch, photo-switch or air sensor.

Symbol C indicates a separator supplying means formed of a pair of supplying rolls 13 and 13' for supplying an embossed separator S' in the vertical direction and a pair of roll cutters 14 and 14'. More preferably, a plurality of pairs of air feeders (not illustrated) utilizing compressed air may be provided in positions adjacent to the embossed separator S' before and after the feeding rolls 13 and 13' and roll cutters 14 and 14'. In such case, they will be effective to prevent the embossed separator S' which is in the course of supply from being wrinkled or shrunk. The roll cutter 14 has a cutting edge $14a$ for making incisions at predetermimed intervals on the embossed separator S'. The embossed separator S' is thus easily separated through the incision and is folded into two parts by the plate P advancing in the horizontal direction so that the plate P may be wrapped with the separator S' in the form of a bag.

Figure 7:
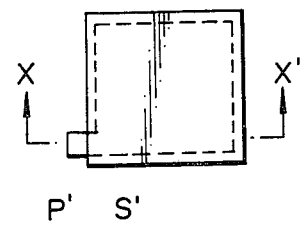
FIG. 7 is a plan view of a plate wrapped with the embossed separator.
Figure 8:
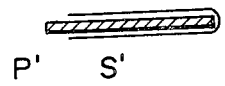
FIG. 8 is a sectional view on line X—X in FIG. 7.
Figure 5:
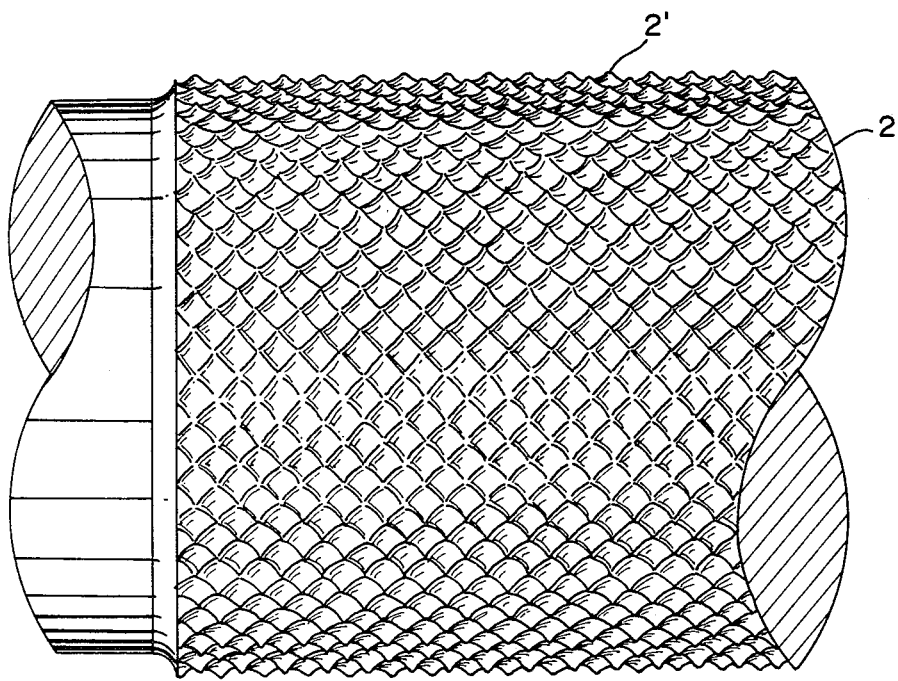
FIG. 5 is an enlarged sectional view of a part of the embossing roll.

Symbol D indicates an embossed separator sealing means consisting of a pair of heating elements 15 and 15', each containing therein a cartridge heater so as to be used to entirely or partly seal by fusing, for example the side parts of the embossed separator S' covering the plate P. Further, the heating elements 15 and 15' may have their temperatures freely adjusted in response to such variations as may exist in the material of the separator S' to be used and the production speed. Thus, a wrapped plate P' covered with the embossed separator S' as shown in FIGS. 7 and 8 is obtained. The wrapped plates P' are stacked with plates of different poles to form a plate unit as is well known, and thereafter a battery plate group is formed of a plurality of thus formed plate units.

The above described embossing means A, plate projecting means B, separator supplying means C and separator sealing means D are operated in conjunction one another by using such well known driving means as, for example, motors 16 and 16' and a chain 17 or a well known controlling means.

Figure 9:
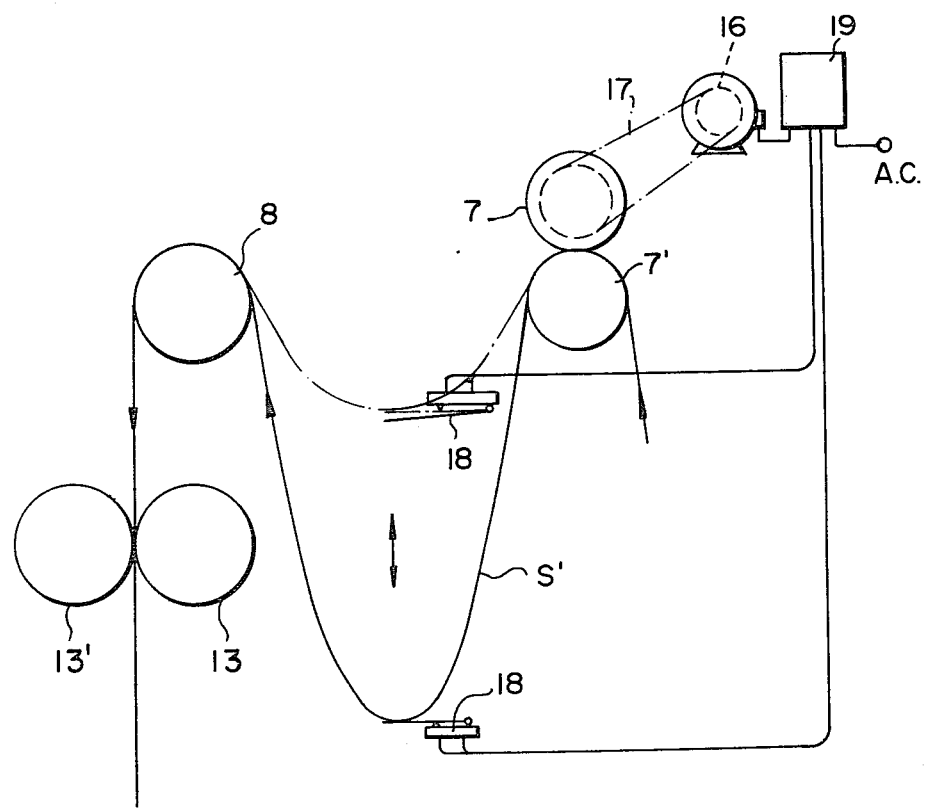
FIG. 9 is a diagram of the essential parts wherein the embossed separator is transferred between the embossing means and separator supplying means.

Now, it is also important to provide a proper sag for the embossed separator S' transferred from the embossing means to the separator supplying means. Otherwise, the embossed separator S' sometimes will be pulled by the separator supplying means so that the embossments may be strained or deformed or the separator itself may be broken. However, if there is more sag than required, such sag will result in a disadvantageous occupation of large space. Therefore, in order to freely set and detect the upper limit and lower limit of the sag, detecting elements 18 and 18' are provided in proper positions between the nipping rolls 7 and 7' and the guiding roll 8. The sag detecting elements are, for example, photoelectric cells connected to an alternating current source through a control box 19, as shown in FIG. 9.

The above mentioned respective means are interconnected with the sag detecting elements so that, in case the sag become more than the upper level limit, the actuation of the separator supplying means may be suspended and, in case it becomes less than the lower level limit, the actuation of the embossing means may be suspended. When the embossing means stops, the embossing roll and elastic roll will be released from pressed contact with each other and the microporous sheet will be disengaged from the embossing roll. As a result, while the heated embossing roll stops, the microporous sheet and elastic roll will be able to be prevented from being damaged by heat.

The operation of the apparatus of the present invention is as follows.

First of all, when the apparatus is started, the flat thin microporous sheet S made of a synethetic resin and wound up on supply reel 1 will be pulled out, will pass between the embossing roll 2 and elastic roll 3 pressed into contact with each other by the pressurizing device 4 through the guiding roll 6 and will be pressed while being heated to have many embossments E as are shown in FIG. 7 formed on the surface to obtain an embossed separator S'. When a microporous sheet 0.15 m/m thick is pressed against the embossing roll, the embossed separator can have a thickness of 0.3 to 1.0 m/m in the embossed areas depending on the pressing force to be applied thereon and can also have an embossed thickness of 2.0 m/m by changing the pattern of the embossing roll. The embossed pattern of the present invention is not limited to that as shown in the drawing and may be varied with different orientations of embossments, of larger embossments or of corrugations. When this embossed separator S' is passed under a low tension through the cooling rolls 5 and 5' so as to be cooled, the embossments E will be stabilized without being deformed. Further, this embossed separator S' will pass through the nipping roll 7 and 7' led in the vertical direction through the guide roll 8 and lowered through the supplying rolls 13 and 13' and roll cutters 14 and 14'. On the other hand, the plates P will be separated one by one by the rocking lever 11 and projecting plate 10 from below the hopper 9 containing many plates P and will be projected forward. In case the plate is not separated, the stopping element 12 will operate to automatically stop the operation of the entire apparatus. The embossed separator S' fed by the supplying rolls 13 and 13' from above so as to intersect rectangularly with the plate P will be folded into two during further projection of the plate P from the stopping element 12 and will simultaneously be easily separated through the incision made by the roll cutters 14 and 14' and the plate P will be covered on both surfaces and the bottom surface with the embossed separator S'. Further, the side parts of this embossed separator S' will be fused and sealed with each other by the heating elements 15 and 15' of the separator jointing means D to obtain a wrapped plate P'.

If the embossed separator is in advance wound around the supply reel, it will usually be distorted due to the rolled tension due to uneven thickness of the separator. If such a distorted embossed separator is used, it will form a wrong wrapping resulting in an impairment of cell performance. Furthermore, the embossed separator wound around the supply reel becomes bulky due to the thick embossed thickness such that when an embossed separator of 300 m length is rolled, the diameter of the roll will be about 500 m/m. On the other hand, in case of the flat microporous sheet, in order to form a roll having about 500 m/m diameter a sheet of 1,500 m length can be wound. Therefore, the flat microporous sheet wound around the supply reel does not require frequent supplement or exchange.

Thus the above described machine of the present invention can be automated to wrap a plate with an embossed separator to obtain storage batteries of a high performance and long life and can be operated at a high efficiency so that the cost of the product may be reduced.

We have shown an embodiment of the present invention. However, it is obvious that various modifications can be also made within a range and scope not deviating from the spirit of the invention. For example, in case there is a sufficient distance between the embossing means and separator feeding means, the cooling rolls may be omitted and the embossed separator may be air-cooled. Further, a dancing roll may be arranged so that the sag of the embossed separator transferred from the embossing means to the separator supplying means be made more positive.

What we claim is:

1. A storage battery plate wrapping machine, comprising:

means for embossing a flat microporous sheet fed from a supply reel to obtain embossed separator material in a continuous length;

a separator feeding means for feeding said embossed separator material;

transport means for transporting the embossed separator from said embossing means to said separator feeding means and including means for detecting the length of separator between said embossing means and said separator feeding means, and means responsive to said means for detecting for controlling the length of separator between said means for embossing and said separator feeding means;

means for cutting said separator;

a plate separating and delivering means for separating and delivering plates from a hopper to fold the cut separator material about a delivered plate; and means for joining the parts of the separator about an individual plate therein.

2. A wrapping machine as in claim 1 wherein said means for controlling controls both said means for embossing and said separator feeding means.

3. A wrapping machine as in claim 1 or 2 wherein said means for detecting detects at least a minimum and maximum length of said separator material, and said means for controlling controls said embossing means or said separator feeding means in dependence upon detection by said detecting means of said at least minimum and maximum length of separator material, respectively.

4. A wrapping machine as in claim 3 wherein said transport means includes a pair of nipping rollers for receiving said separator material from said means for embossing and a guide roller for transporting said separator material from said nipping rollers by forming a sag in the separator material between said nipping rollers and said guide roller, and said means for detecting includes sag detector elements for detecting said at least minimum and maximum sag of said separator material, respectively.

5. A wrapping machine as in claim 1 wherein said means for embossing includes an embossing roll and an elastic roll mounted in movable relationship to one another, means for pressing said embossing roll and elastic roll into pressing relationship with one another, said embossing roll including projections on the surface thereof, and means for rotating said embossing roll for feeding said flat microporous sheet from said supply reel and between said embossing roll and elastic roll.

6. A wrapping machine as in claim 5 wherein said embossing means further includes means for heating said embossing roll and means for cooling the embossed separator material.

7. A wrapping machine as in claim 6 wherein said means for cooling includes a pair of spaced cooling rollers and said means for embossing further includes means for driving at least one of said cooling rolls for transporting the embossed separator material from said embossing roll and elastic roll through said spaced cooling rollers under low tension without substantial deformation.

8. A wrapping machine as in any of claims 5, 6 or 7 wherein said means for detecting detects at least a minimum and maximum length of said separator material and said means for controlling includes means for deactuating said means for rotating said embossing roll upon detection of said at least minimum length, and for deactuating said pressing means to enable said embossing roll and said elastic roll to separate from one another upon detection of said minimum length.

* * * * *